United States Patent [19]
Allen et al.

[11] Patent Number: 6,152,990
[45] Date of Patent: Nov. 28, 2000

[54] DEVICE FOR REMOVING AND RETAINING VOLATILE COMPOUNDS AND METHOD OF EMPLOYING THE SAME

[75] Inventors: Fred M. Allen, Princeton Junction; Charles Knott, Franklin Park, both of N.J.

[73] Assignee: Engelhard Corporation, Iselin, N.J.

[21] Appl. No.: 09/245,159

[22] Filed: Feb. 4, 1999

[51] Int. Cl.⁷ .......................... B01D 53/04; B01D 53/06
[52] U.S. Cl. ................... 95/90; 95/107; 95/120; 95/143; 95/285; 96/117.5; 96/222; 96/417
[58] Field of Search ................. 95/90, 107, 117–120, 95/141, 143–147, 285; 96/117, 117.5, 222, 417, FOR 170, FOR 171

[56] References Cited

U.S. PATENT DOCUMENTS

| | | | |
|---|---|---|---|
| 3,377,294 | 4/1968 | Davis et al. | 96/117.5 X |
| 3,505,783 | 9/1967 | Graham | 55/33 |
| 3,895,928 | 7/1975 | Moran | 96/222 X |
| 3,923,458 | 12/1975 | Moran | 96/222 X |
| 4,155,358 | 5/1979 | McAllister et al. | 96/117.5 X |
| 4,336,038 | 6/1982 | Schultheiss et al. | 96/417 |
| 4,519,816 | 5/1985 | Clarke | 95/147 X |
| 4,597,781 | 7/1986 | Spector | 96/222 X |
| 4,629,479 | 12/1986 | Cantoni | 96/417 X |
| 4,795,482 | 1/1989 | Gioffre et al. | 55/75 |
| 4,875,914 | 10/1989 | Wireman | 55/389 |
| 4,938,939 | 7/1990 | Kuznicki | 423/326 |
| 5,346,535 | 9/1994 | Kuznicki et al. | 95/96 |
| 5,354,540 | 10/1994 | Neumiller | 422/174 |
| 5,512,083 | 4/1996 | Dunne | 95/144 X |
| 5,536,301 | 7/1996 | Lansbarkis et al. | 95/147 X |
| 5,733,451 | 3/1998 | Coellner | 210/496 |
| 5,766,312 | 6/1998 | Furhmann et al. | 95/117 |
| 6,001,320 | 12/1999 | Addiego | 95/143 X |

FOREIGN PATENT DOCUMENTS

| | | |
|---|---|---|
| 61-161121 | 7/1986 | Japan . |
| 757037 | 1/1955 | United Kingdom . |

*Primary Examiner*—Robert H. Spitzer
*Attorney, Agent, or Firm*—Stephen I. Miller

[57] ABSTRACT

Device and method for removing volatile compounds from a gas stream, the device including a material which is capable of removing and retaining the volatile compounds while displaying a visible color change, wherein at least some moisture has been removed from the material and there is relative movement between the gas stream and the material.

34 Claims, 3 Drawing Sheets

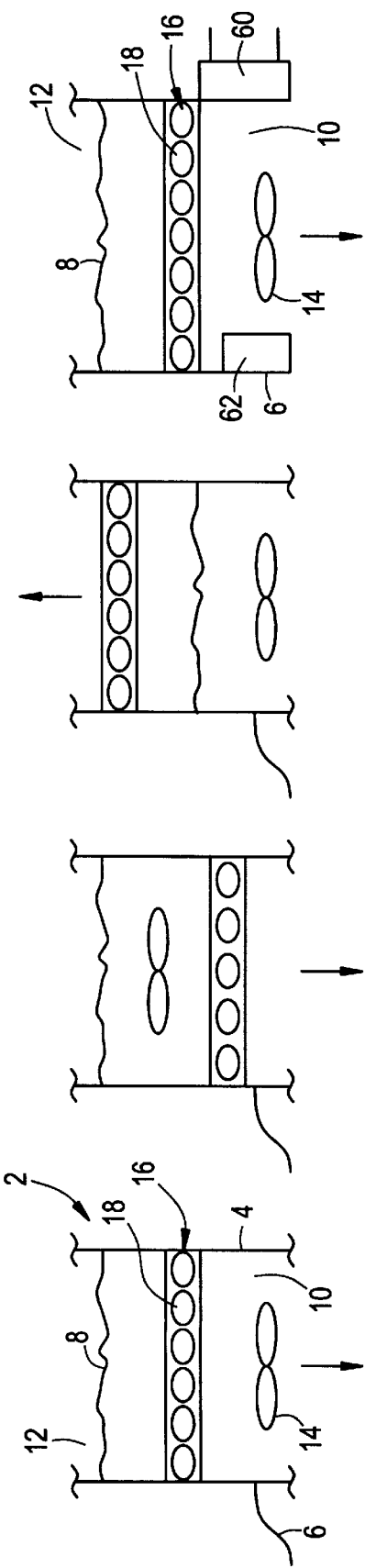

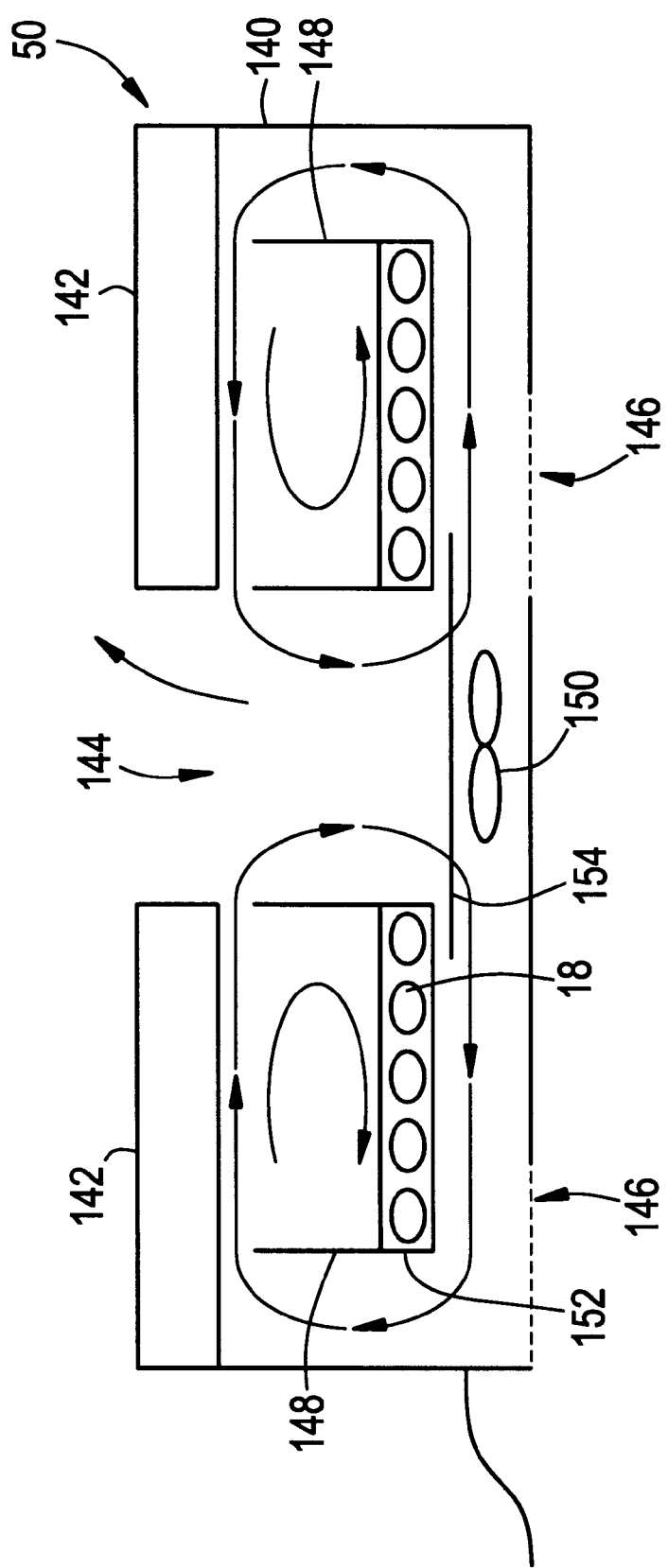

DEVICE FOR REMOVING AND RETAINING VOLATILE COMPOUNDS AND METHOD OF EMPLOYING THE SAME

FIELD OF THE INVENTION

The present invention is directed to a device for removing volatile compounds from a gas stream and retaining such compounds so that the device can serve to remove harmful compounds such as pollutants, irritants and noxious compounds from a gas stream containing the same. The device of the present invention may be employed on a residential or commercial scale and, in a preferred form of the invention, the retention of the volatile compounds causes a visible color change which provides an indication of the remaining capacity of the device to remove and retain such compounds from the gas stream, an indicator of the particular volatile compounds retained and/or the amount of such compounds retained.

BACKGROUND OF THE INVENTION

A variety of devices have been employed to remove volatile compounds, especially, volatile organic compounds from a gas stream such as air. For example, U.S. Pat. No. 5,354,540 discloses a device in the form of a catalytic air purification device which operates at low temperatures for the removal of volatile organic compounds from an ambient air space. The air passes through a structure coated with a catalyst which catalytically oxidizes the compounds. The structure is preferably in the form of a honeycomb and is heated by an electric heating element.

Japanese Patent Document No. 61-161,121 discloses a deodorizer employing a blower and a deodorizing filter with an effective-life indicator installed on the suction side of the deodorizing filter or on the blowing side. A color change is observed in the effective-life indicator according to the offensive-odor component removed from the gas stream.

The above-mentioned devices either employ a catalyst system for converting volatile compounds to different compounds through a chemical reaction or employ a filtering system and a separate indicator system which add significant complexity to such devices.

U.S. Pat. Nos. 4,938,939 and 5,346,535, each incorporated herein by reference, teach a new class of adsorbent materials principally based on zeolites which have very fine pore sizes. U.S. Pat. No. 4,795,482 discloses a process of absorbing odors through the use of a crystalline siliceous molecular sieve material having pore sizes of at least 5.5 Angstroms.

While devices for catalyzing the destruction of volatile compounds or employing systems having separate filter and indicator systems are known in the art as indicated above, there remains a need to provide an effective means of removing and retaining volatile compounds within a device. There is also a need to provide a visual system for determining the relative capacity of the device to continue to remove and retain such compounds, to identify the particular compounds or classes of compounds that are removed from the gas stream, and/or to provide an indication of the relative amount of such compounds removed from the gas stream.

SUMMARY OF THE INVENTION

The present invention is generally directed to a device and a method of employing the same in which the device removes and retains volatile compounds from a gas stream. The volatile compounds are removed and retained in the device through the employment of a material which not only can remove and retain such compounds but exhibits a visible color change during the process. The visible color change is indicative of the remaining capacity of the device to remove and retain volatile compounds, the identification of the type or specific compounds removed from the gas stream, and/or the relative amount of the compounds removed and retained from the gas stream.

In an embodiment of the present invention, there is provided a device for removing and retaining volatile compounds from a gas comprising:

(a) a material capable of removing and retaining the volatile compounds from the gas stream and displaying a visible color change thereby;

(b) means for generating relative movement between said gas stream and the material; and (c) means for removing at least some of the moisture from the material to facilitate the removing and retaining of the volatile compounds.

Methods of employing the device to remove volatile compounds from a gas stream are also within the scope of the present invention.

BRIEF DESCRIPTION OF THE DRAWINGS

The following drawings in which like reference characters indicate like parts are illustrative of embodiments of the invention and are not intended to limit the invention as encompassed by the claims forming part of the application.

FIG. 1A is a schematic view of an embodiment of the invention wherein a remote fan provides movement of a gas stream so that it is first heated and then passes through an adsorbent material;

FIGS. 1B and 1C are respective schematic views of embodiments of the invention similar to FIG. 1A with the heater, fan, and adsorbent material provided in different respective locations;

FIG. 1D is a schematic view of an embodiment similar to FIG. 1A further including a plug-in receptacle and a light source;

FIG. 2A is a schematic view of a further embodiment of the invention particularly adapted for placement on a flat surface such as a desk top in which the heater, fan and adsorbent material have the same relative configuration as in FIG. 1A;

FIGS. 2B and 2C are schematic views of a device similar to FIG. 2A having the arrangement of the heater, fan and adsorbent material as shown respectively in FIGS. 1B and 1C;

FIG. 3 is a schematic view of a food dehydrator incorporating an embodiment of the invention;

DETAILED DESCRIPTION OF THE INVENTION

Figure 4B:
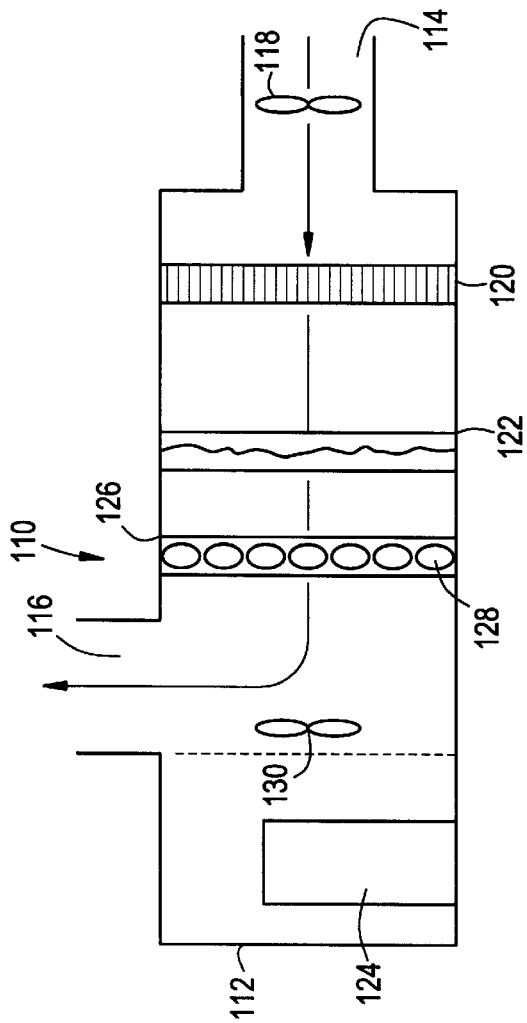
FIG. 4B is another embodiment of the invention adapted for use with a central heating unit.

The present invention is generally directed to a device and method for removing and retaining volatile compounds from a gas stream such as a stream of air. The device includes a material capable of removing and retaining the volatile compounds from the gas stream. There is displayed a visible color change when the volatile compounds are retained therein. The color change is indicative of any one or more of the following: the relative remaining capacity of the material to continue to remove and retain volatile compounds; an identification of the type or specific compounds removed from the gas stream; and the relative amount of such compounds removed. In accordance with the present invention, the gas stream and material move relative to each other. More specifically, the gas stream may move while the material remains stationary. The gas stream may remain stagnant while the material moves or both the gas stream and material may be in motion.

As used herein the term "volatile compounds" is intended to include compounds which are considered to be impurities within a gas stream with typical concentrations of no more than several hundred parts per million. These compounds are typically organic or inorganic compounds which are desirably removed from the gas stream.

As used herein the term "color change" as it applies to a change in the color of the adsorbent material means that the color change is visible to the naked eye. The color change may be dramatic such as a change from white to orange which can occur when gasoline is absorbed in an ETS-10 absorbent disclosed in U.S. Pat. No. 5,346,535. The color change may be subtle such as a change in the shade of a single color as represented when ETS-10 (white color) absorbs isopropyl alcohol and turns off-white. In a preferred embodiment, the material is stationery while the gas stream is caused to flow into contact with the stationary material.

The material must be present in an environment where at least some of the moisture is removed from the material which facilitates the removal and retaining of the volatile compounds. It has been observed that relatively high amounts of moisture inhibit the removal and retention of volatile compounds and therefore at least some of this moisture must be removed. In a preferred form of the invention, the material is heated to a temperature sufficient to remove at least some of the moisture, preferably most of the moisture, and most preferably at least a substantial amount of the moisture so that the material can readily remove and retain the volatile compounds.

As will be shown by the embodiments discussed hereinafter, the present device can be employed in a wide variety of conditions and locations. The device can be employed in a residence in any location therein where volatile compounds are desirably removed from the atmosphere. Typical locations can include ovens, heating units (e.g. centralized heating units, space heaters and the like), computer equipment, diaper pails, litter boxes, bathrooms, basements, garages, refrigerators and the like. The present device may be also used in industrial applications in any environment where volatile compounds (e.g. pollutants, noxious compounds, irritants, odoriferous compounds and the like) are present. In addition, the present device can be employed in mobile transportation systems such as aircraft, motor vehicles, boats, trains and the like to improve air quality.

In one embodiment of the present invention, the device can be plugged into a typical electrical socket and placed in any indoor location that has such a socket. Referring to FIGS. 1A–1C, there is shown a plug-in device which is particularly suited to electrical contact with a conventional electrical outlet. It will be understood that equally applicable to the embodiments of 1A–1C, a battery may replace the electrical connection to the outlet to provide a battery operated device.

Referring to FIG. 1A there is disclosed a device 2 contained within a housing 4. The housing is connected to an electrical outlet (not shown) through a wire connector 6. As previously indicated, the wire connector 6 can be replaced by a battery in a conventional manner and the device can be employed as a battery operated device.

Within the housing 4 there is provided a heating element 8 capable of generating a temperature in proximity thereto at least sufficient to remove at least some of the moisture contained within the material used to remove and retain volatile compounds. The typical temperature generated by the heating element 8 is in the range of from about 100 F to 200 F. At these temperatures, the material as described hereinafter has at least some of the moisture, preferably a substantial portion of the moisture removed therefrom to facilitate the removal and retaining of volatile compounds from the gas stream.

Referring again to FIG. 1A, the gas stream (e.g. an air stream) is drawn into an inlet opening 12 of the device and exits out of an opposed outlet opening 10. In the specific embodiment of FIG. 1A, a fan 14 is positioned proximate to the outlet opening 10 so as to provide movement to the gas stream and thereby draw the gas stream through the inlet opening 12 past the heating element 8 and in contact with the material (which in this embodiment of the invention is stationary) to remove and retain volatile compounds contained within the gas stream.

The device 2 is provided with an assembly 16 containing a material 18 which is capable of removing and retaining volatile compounds therein. The assembly 16 may be in the form of a substrate having the material coated thereon or incorporated therein. A particularly preferred substrate is a honeycomb configuration of the type shown and described in U.S. Pat. No. 5,733,451, incorporated herein by reference. The substrate may be made from any suitable material which does not adversely affect the material and which removes and retains the volatile compounds. The substrates may be made from such materials as metals, ceramics, plastics, and paper products.

The assembly 16 may include the material 18 in the form of a bed of powder, granules or extrudates, or coated on or incorporated in particles (e.g. fibers, spheres, pellets and the like) that are fashioned into a filter medium through which the air containing volatile compounds will pass. Examples include fiberglass, polyester filters, latex spheres, carbon or alumina granules.

The material 18 used to remove and retain the volatile compounds is preferably an adsorbent material and most preferably one which has a microporous structure in which moisture contained within the pores can be relatively easily removed by heating and the like.

Preferred materials are the acidic form of inorganic microporous materials. Especially preferred materials are those having an average pore size of at least 5 Angstroms. Suitable examples of such materials include microporous aluminosilicates (zeolites) such as Y zeolite, beta zeolite and ZSM-5 zeolite. Other materials include microporous titanosilicates. A particularly preferred titanosilicate material is ETS-10 as described in U.S. Pat. No. 5,346,535, incorporated herein by reference. Beta zeolites as synthesized or chemically and/or physically treated versions thereof may be preferred materials for operation under relatively high humidity conditions such as may be found in bathrooms, locker rooms and the like. This is because these materials absorb volatile compounds but may not release odors on exposure to moisture.

The class of adsorbent materials described above not only can remove and retain volatile compounds within the microporous structure but it is relatively easy to remove moisture from such materials by drying, heating, evaporation and the like. Heating through the employment of a heating element 8 is preferred because it rapidly reduces the moisture content of the adsorbent material. In addition to these advantages, this class of adsorbent materials also produces an observable color change as volatile compounds are removed from the gas stream and retained within the microporous structure.

As previously indicated the color change observed when the material removes and retains volatile compounds will vary depending on the type or class of compounds retained, the temperature and relative velocity of the gas stream and the concentration of the volatile compounds. The change in color may be dramatic or subtle. By way of example, granulated samples of ETS-10 were placed in a dehydrator in an enclosed space and heated at 160 F for twenty-four hours to remove moisture. Various volatile compounds as indicated below were introduced during this time to the samples and color change from white (ETS-10) were observed as shown in Table 1.

TABLE 1

| Sample # | Volatile Compound(s)* | Color Change |
| --- | --- | --- |
| Control | Indoor Air-Room Temp. | None |
| 1 | Indoor air | Pale whitish yellow |
| 2 | Gasoline | Orange |
| 3 | Toluene | Yellow |
| 4 | Isopropyl alcohol | Off-white |
| 5 | Benzene | Yellow |
| 6 | Heptane | Pale whitish-yellow |
| 7 | Methanol | Off-white |
| 8 | Acetone | Whitish-yellow |
| 9 | Cyclohexane | Whitish-yellow |
| 10 | Dodecane | Pale whitish-yellow |
| 11 | Hexane | Pale whitish-yellow |
| 12 | Xylene | Yellowish-orange |
| 13 | Hexene | Whitish-orange |
| 14 | Outside Air | Pale off whit |

*measured ar 160 F unless otherwise indicated, for 24 hours.

It will be understood that the selection of the material 18 may have an effect on the observable color change for a given volatile compound which is removable and retained by the device of the present invention. For example for atmospheric air containing part per billion levels of volatile compounds in the form of hydrocarbons such as benzene, toluene and xylene, the color change when employing Y zeolite is from white to yellowish-orange. The color change when employing ZSM-5 zeolite is from white to yellowish-brown and when employing beta zeolite is from white to brown.

The color changing material described above may be used alone or in combination with a non-color changing material which can remove and retain volatile compounds. Such non-color changing materials include, but are not limited to, carbon, baking soda, clays, and the like, and combinations thereof. The non-color changing materials may be separate and apart from the color changing materials, or formed into mixtures, layers, composites and the like with the color changing materials.

The plug-in device shown in FIG. 1A or the corresponding battery operated device are fully operative when the heating element 8, the fan 14 and the assembly 16 are rearranged relative to one another. Referring to FIG. 1B, an embodiment is shown where the fan 14 is positioned between the heating element 8 and the adsorbent assembly 16. The fan 14 draws the gas stream through the inlet opening 12 into contact with the heating element 8 and downstream of the fan 14. The heated gas stream comes into contact with the adsorbent assembly and the volatile compounds are therefore removed and retained therein so as to produce a gas stream having a lower content of volatile compounds.

In the embodiment shown in FIG. 1C, the fan 14 is positioned proximate to the inlet opening 12 to create a gas stream which first contacts the heating element 8 and thereafter the adsorbent assembly 16 to provide a gas stream having a reduced volatile compound content through the outlet opening 10. Rather than have a separate adsorbent assembly, the present invention is equally applicable to having the adsorbent material coated directly onto a substrate such as the heating element 8 which may be in the form of a conventional resistance wire or metal/ceramic space heater.

As shown in FIG. 1D, the device 2 may be provided with additional components to make use of the device easier, more attractive and the like. The device 2 may include a plug-in receptacle 60 to facilitate entry into an electric outlet (not shown) and/or a light 62 to illuminate the device 2 so that it is visible even in the dark, and in some cases can at least partially illuminate the surrounding area including a living space such as a bedroom, closet and the like.

The device of the present invention may be employed on a countertop both with a plug-in version and a battery operated version. Embodiments of this form of the invention are shown in FIGS. 2A–2C. As shown first in FIG. 2A, the device 30 includes a housing 32 having a wire connector 34 electrically connected to an outlet (not shown). As described above in connection with the embodiment of FIG. 1A, the housing includes a heating element 36, a fan 38 and an assembly 40 for removing and retaining volatile compounds including a material 42 for this purpose. The basic components of the device 30 are the same as those described above in connection with FIG. 1A. It will be understood, however, that the device shown in FIG. 2A may be larger than the plug-in or battery operated devices previously described. In this event the size of the assembly 40 may be larger and the amount of the material 42 may be greater which may require a larger capacity fan 38 and a higher capacity heating element 36. It should be understood, however, that the temperature of the environment contained within the device should be sufficient to remove at least some of the moisture from the material 42 and preferably provide a temperature of from about 100 F to 200 F.

In the embodiments shown in FIGS. 2B and 2C, the device 30 includes the same corresponding arrangement of the fan, the adsorbent material and the heating element as described previously in connection with FIGS. 1B and 1C, respectively.

The device of the present invention may be incorporated into a device in which a circulatory flow of a gas stream is generated such as in a food dehydrator. Referring to FIG. 3, there is shown a device 50 in the form of a food dehydrator having a housing 140 with a lid 142 defining an outlet 144 and an opposed inlet 146. Within the housing 140 is at least one food storage compartment 148 and a centrally positioned fan 150 which forces the gas stream (e.g. air) through the inlet and circulates the air within the housing 140 in proximity to the food storage compartments 148. Contained within the food storage compartment is a region 152 containing a material 18 capable of removing and retaining volatile compounds from the gas stream. Also contained within the housing 140 is a heating element 154 for heating the material 18 to remove moisture therefrom so that the material may readily remove and retain volatile compounds.

Figure 4A:
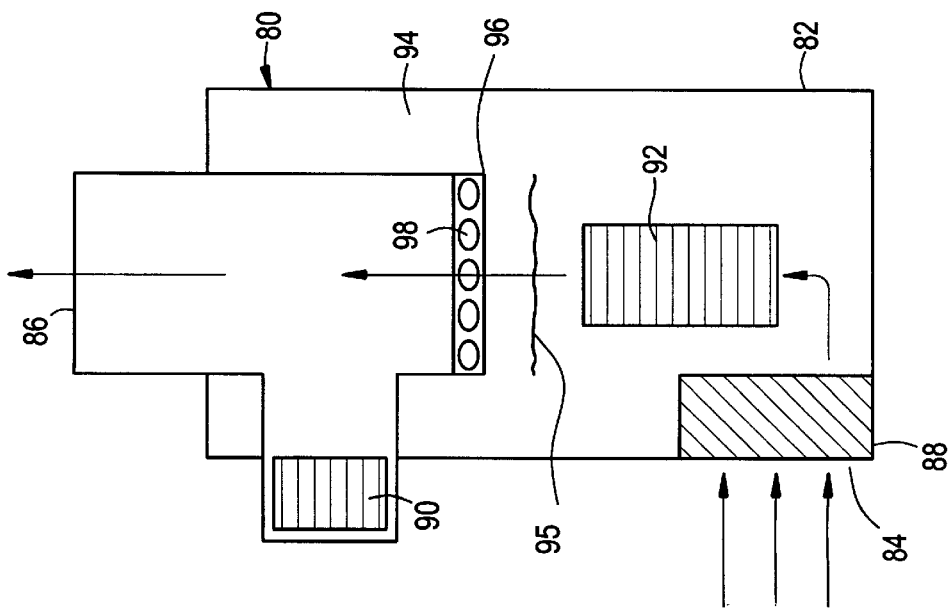
FIG. 4A is a still further embodiment of the invention which is employed in conjunction with a central heating unit typically found in a residence location.

The device of the present invention may be incorporated into a residential or industrial furnace assembly to remove volatile compounds before the air stream is circulated back into the home or working environment. As shown in FIG. 4A, one such embodiment provides a furnace assembly 80 contained within a housing 82 having an inlet opening 84 and an outlet opening 86. The furnace is provided with a conventional air filter assembly 88 which is particularly effective at removing dust, soot and other solid particles from the air stream. There may also be provided a humidifier assembly 90 which is conventional in the art for adding moisture to the treated air stream to provide a higher relative humidity to the environment. In accordance with the present invention, the filtered air stream coming from the air filter assembly 88 is caused to move into operative contact via a fan 92 within an elevated temperature zone 94 made possible by heat already present in the furnace assembly 80. The heated air is then passed through an adsorbent assembly 96 containing a material 98 which is capable of removing and retaining volatile compounds from the filtered air stream. The air stream with a reduced volatile compound content exits the furnace assembly 80 through the outlet opening 86.

In an additional embodiment of the invention applicable to furnace units, there may be provided a heater or condenser coil to elevate the temperature of the air stream and to minimize the amount of moisture which comes into contact with the adsorbent assembly. There may also be provided optional evaporator pads which give off moisture to humidify the air stream. Referring to FIG. 4B, a furnace assembly 110 is contained within a housing 112 having an inlet opening 114 and an outlet opening 116. A fan 118 is positioned in the inlet to provide the air stream with sufficient velocity to move through the system. Downstream of the fan 118 is an evaporator pad 120 containing moisture for emitting into the passing air stream followed by a heating element 122. In an optional form of the invention the heating element 122 may be replaced by a condenser coil which is in operative heat exchange relationship with a boiler 124 to add heat to the environment surrounding the adsorbent assembly 126 containing the adsorbent material 128. In the embodiment shown in FIG. 4B, a second fan 130 may be provided to create enhanced movement of the air stream.

The present invention is directed to the removal of a wide variety of volatile compounds from a gas stream containing the same at a range of concentrations. The volatile compounds can include organic compounds and inorganic compounds. Examples of organic compounds include substituted and unsubstituted aliphatic, olefinic and aromatic compounds including substituted and unsubstituted hydrocarbons, such as halogenated hydrocarbons. More specific examples include hexane, cyclohexane, hexene, benzene, toluene, xylenes, isopropyl alcohol, acetone, formaldehyde, benzaldehyde, trichloroethylene and the like. Examples of inorganic compounds include hydrogen sulfide, ammonia, and the like.

The material which is employed to remove and retain the volatile compounds undergoes a color change. The color change is indicative of the relative amount of volatile compounds which have been adsorbed as well as the relative capacity of the material to absorb additional amounts of volatile compounds. For example, a slight color change over a relatively small surface area of the material is indicative of a relatively small amount of absorption and a relatively large remaining capacity for absorption of the volatile compounds. The amount of volatile compounds removed and retained or remaining capacity can be estimated and is dependent on the pore capacity of the material, the type of volatile compounds and the quantity of the material.

As previously indicated the color change can be used to identify individual compounds or classes of compounds since the type of material selected and the type of volatile compounds adsorbed produce in many cases a signature color change which can be used to identify such compounds.

The advantages of the color change are that the user can observe when a new device or replacement of the material is desired. The color change can be used to assist in approximating the amount of volatile compounds removed from a given area and also identify the type of compounds being removed.

The material employed in the present invention can be rejuvenated and reused. The volatile compounds retained within the material can be removed therefrom by heating (e.g. thermal desorption) or preferably by exposing the material to liquid water or water vapor or other suitable solvent for the volatile compounds. The device therefore may be cleaned with water to remove the volatile compounds or provided with a moist stream of gas such as in the embodiment of FIG. 4B to clean the adsorbent material.

As previously indicated there is relative movement between the gas stream and the material. As previously shown in the reference figures the material may be incorporated into a stationary device while the gas stream is caused to move (e.g. through the use of a fan) relative to the material.

However, the present invention is fully operational when the material moves relative to the gas stream. Movement of the material relative to the gas stream can achieve the desirable removal of moisture from the material. One such example would be applying the device of the present invention in a moving vehicle such as an automobile (for example, a coated insert, radiator, and/or condenser coil). In one such embodiment, the device can be attached to the engine compartment of an automobile, for example, a coated insert, radiator, and/or condenser coil. When the automobile is in the state of motion, the device and the material contained therein is caused to move relative to the gas stream. This will result in the material removing and retaining volatile compounds present in the air which enters the engine compartment of the automobile. It will be noted that when the material moves and the gas stream remains stationary, it may not be necessary to employ a fan as described in the embodiments of FIGS. 1–4B. This is because the principal function of the fan is to generate movement of the gas stream. If movement of the gas stream is not necessary such as when the material is moving relative to the gas stream, the fan may be eliminated.

It will also be noted that a fragrance may be added to the device such as by applying any common fragrance material to the adsorbent material so as to provide the surrounding atmosphere with a fragrant aroma. Suitable fragrances (e.g. vanilla) are well known to those of ordinary skill in the art.

What is claimed:

1. A method for removing volatile compounds from a gas stream comprising removing at least some of the moisture from a material capable of removing and retaining volatile compounds from said gas stream and displaying a visible color change thereby and generating relative movement between the gas stream and the material.

2. A device for removing and retaining volatile compounds from a gas stream comprising:

(a) a material capable of removing and retaining said volatile compounds from said gas stream and displaying a visible color change thereby;

(b) means for generating relative movement between said gas stream and said material; and (c) means for removing at least some of the moisture from the material to facilitate the removing and retaining of the volatile compounds.

3. The device of claim 2 wherein the gas stream comprises air.

4. The device of claim 2 wherein the means in part (b) comprises at least one fan.

5. The device of claim 4 wherein the gas stream moves relative to the device.

6. The device of claim 2 wherein the means for removing moisture comprises a heating means.

7. The device of claim 6 wherein the heating means maintains the temperature of the material in the range of from about 100 F to 200 F.

8. The device of claim 2 wherein the device further comprises an electrical connector for plugging the device into an electrical outlet.

9. The device of claim 2 wherein the device further comprises a battery.

10. The device of claim 2 further comprising a non-color changing adsorbent material.

11. The device of claim 2 wherein the color change is related to the amount of the volatile compounds which are removed and retained by the material.

12. The device of claim 2 wherein the color change is indicative of the type or class of volatile compounds which are removed and retained by the material.

13. The device of claim 2 wherein the color change is related to the remaining capacity of the material to remove and retain the volatile compounds.

14. The device of claim 2 wherein at least the material is contained within a replaceable cartridge.

15. The device of claim 2 wherein the volatile compounds are selected from organic compounds, inorganic compounds and combinations thereof.

16. The device of claim 2 further comprising a light source for emitting light.

17. The device of claim 2 further comprising an electrical connection for connecting to a power source.

18. The device of claim 17 wherein the electrical connection is a plug-in receptacle.

19. The device of claim 2 further comprising means for adding moisture to the treated gas stream.

20. The device of claim 19 further comprising fragrance means for delivering a fragrance to the treated gas stream.

21. The device of claim 2 wherein said material is a synthesized beta zeolite or chemically or physically treated version thereof.

22. The device of claim 21 wherein said gas stream contains a relatively high moisture content.

23. The device of claim 2 wherein the material is coated on or incorporated in a substrate.

24. The device of claim 2 wherein the material is in the form of a powder, granules, extrudates.

25. The device of claim 24 wherein said material is coated on or incorporated in particles that are fashioned into a filter medium.

26. The device of claim 2 wherein the means in part (b) is a moving vehicle.

27. The device of claim 26 wherein the moving vehicle is an automobile.

28. The device of claim 26 or 27 wherein the device moves relative to the gas stream.

29. The device of claim 3 wherein the material is an adsorbent material.

30. The device of claim 29 wherein the adsorbent material has a microporous structure.

31. The device of claim 29 or 30 wherein the adsorbent material is the acidic form of an inorganic microporous material.

32. The device of claim 31 wherein the microporous material has an average pore size of at least 5 Angstroms.

33. The device of claim 31 wherein the material is selected from the group consisting of microporous aluminosilicates (zeolites) and titanosilicates.

34. The device of claim 31 wherein the material is selected from the group consisting of ETS-10, Y zeolite, beta zeolite and ZSM-5.

* * * * *